US009308907B2

(12) United States Patent
Moon et al.

(10) Patent No.: US 9,308,907 B2
(45) Date of Patent: Apr. 12, 2016

(54) APPARATUS AND METHOD FOR CONTROLLING CLUTCH SLIP OF HYBRID VEHICLE

(71) Applicant: Hyundai Motor Company, Seoul (KR)

(72) Inventors: Seongwook Moon, Seoul (KR); Jonghan Oh, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 118 days.

(21) Appl. No.: 14/335,240

(22) Filed: Jul. 18, 2014

(65) Prior Publication Data

US 2015/0183415 A1    Jul. 2, 2015

(30) Foreign Application Priority Data

Dec. 26, 2013   (KR) .......................... 10-2013-0163786

(51) Int. Cl.

| B60W 10/02 | (2006.01) |
| F16D 48/06 | (2006.01) |
| B60K 6/48 | (2007.10) |
| B60W 10/113 | (2012.01) |
| B60W 20/00 | (2006.01) |

(52) U.S. Cl.
CPC ................ *B60W 10/02* (2013.01); *B60K 6/48* (2013.01); *B60W 10/113* (2013.01); *B60W 20/00* (2013.01); *F16D 48/06* (2013.01); *B60Y 2300/429* (2013.01); *B60Y 2400/4242* (2013.01); *Y10S 903/902* (2013.01)

(58) Field of Classification Search
None
See application file for complete search history.

(56) References Cited

U.S. PATENT DOCUMENTS

| 8,473,139 | B1* | 6/2013 | Futamura | ............... | B60W 20/30 |
| | | | | | 180/337 |
| 8,480,537 | B2 | 7/2013 | Sano et al. | | |
| 8,725,374 | B2* | 5/2014 | Hodrus | ................... | F16D 48/06 |
| | | | | | 701/51 |
| 2007/0056784 | A1* | 3/2007 | Joe | .......................... | B60K 6/48 |
| | | | | | 180/65.245 |
| 2007/0080005 | A1* | 4/2007 | Joe | .......................... | B60K 6/48 |
| | | | | | 180/65.245 |
| 2007/0275823 | A1* | 11/2007 | Motosugi | ................. | B60K 6/48 |
| | | | | | 477/176 |
| 2010/0279818 | A1* | 11/2010 | Soliman | ................ | B60W 10/02 |
| | | | | | 477/5 |

(Continued)

FOREIGN PATENT DOCUMENTS

| JP | 2012-162099 | 2/2011 |
| KR | 10-2011-0062133 | 6/2011 |
| KR | 10-2013-0081298 | 7/2013 |

*Primary Examiner* — Jonathan M Dager
(74) *Attorney, Agent, or Firm* — Mintz Levin Cohn Ferris Glovsky and Popeo, P.C.; Peter F. Corless

(57) ABSTRACT

An apparatus and a method for controlling a clutch slip of a hybrid vehicle enable slipping even in a dry engine clutch having a small heat capacity by simultaneously slipping an engine clutch and a dual clutch in a hybrid vehicle mounted with a dual clutch transmission (DCT) to disperse the heat capacity. The apparatus for controlling the clutch slip of a hybrid vehicle includes: an engine clutch selectively connecting an engine and a motor generating power; a dual clutch mechanism selectively connecting the motor and a transmission; and a controller controlling an operation of the engine clutch and two clutches of the dual clutch mechanism, in which the controller may simultaneously perform a dual clutch slip control according to a motor speed and an engine clutch slip control according to an engine speed.

14 Claims, 2 Drawing Sheets

(56) References Cited

U.S. PATENT DOCUMENTS

| | | | |
|---|---|---|---|
| 2011/0301791 A1* | 12/2011 | Swales | B60K 6/485 701/22 |
| 2012/0109439 A1* | 5/2012 | Akebono | B60W 10/02 701/22 |
| 2012/0109478 A1* | 5/2012 | Mochiyama | B60W 10/02 701/68 |
| 2012/0289376 A1* | 11/2012 | Yang | B60W 10/06 477/5 |
| 2012/0290249 A1* | 11/2012 | Hebbale | F16D 48/06 702/130 |
| 2013/0018556 A1* | 1/2013 | Williams | F16D 48/06 701/60 |
| 2013/0035201 A1* | 2/2013 | Falkenstein | B60W 10/02 477/5 |
| 2013/0226384 A1* | 8/2013 | Tanishima | B60L 11/123 701/22 |
| 2013/0231832 A1* | 9/2013 | Yang | B60K 17/02 701/59 |
| 2013/0247870 A1* | 9/2013 | Sauvlet | B60K 6/48 123/352 |
| 2013/0282243 A1* | 10/2013 | Tao | F16H 61/12 701/54 |
| 2013/0282246 A1* | 10/2013 | Burtch | F16H 61/688 701/67 |
| 2013/0282247 A1* | 10/2013 | Burtch | F16D 48/066 701/67 |
| 2013/0297136 A1* | 11/2013 | Yamanaka | B60K 6/48 701/22 |
| 2013/0297161 A1* | 11/2013 | Gibson | B60W 20/00 701/54 |
| 2013/0337973 A1* | 12/2013 | Maass | B60W 10/02 477/5 |
| 2014/0121925 A1* | 5/2014 | Yoon | B60W 10/02 701/68 |
| 2014/0129066 A1* | 5/2014 | Inoue | B60W 20/40 701/22 |
| 2014/0163802 A1* | 6/2014 | Tokai | F16H 61/14 701/22 |
| 2014/0228168 A1* | 8/2014 | Kaufman | B60K 6/442 477/5 |
| 2015/0166040 A1* | 6/2015 | Cho | F16H 61/061 701/53 |
| 2015/0232080 A1* | 8/2015 | Park | B60W 10/08 701/22 |
| 2015/0298690 A1* | 10/2015 | Onouchi | B60K 6/48 701/22 |
| 2015/0307087 A1* | 10/2015 | Eo | G01M 13/022 701/22 |
| 2015/0336570 A1* | 11/2015 | Sugimura | B60K 6/48 701/22 |
| 2015/0337952 A1* | 11/2015 | Cho | F16H 61/10 701/54 |
| 2015/0344025 A1* | 12/2015 | Park | B60K 6/48 701/22 |

* cited by examiner

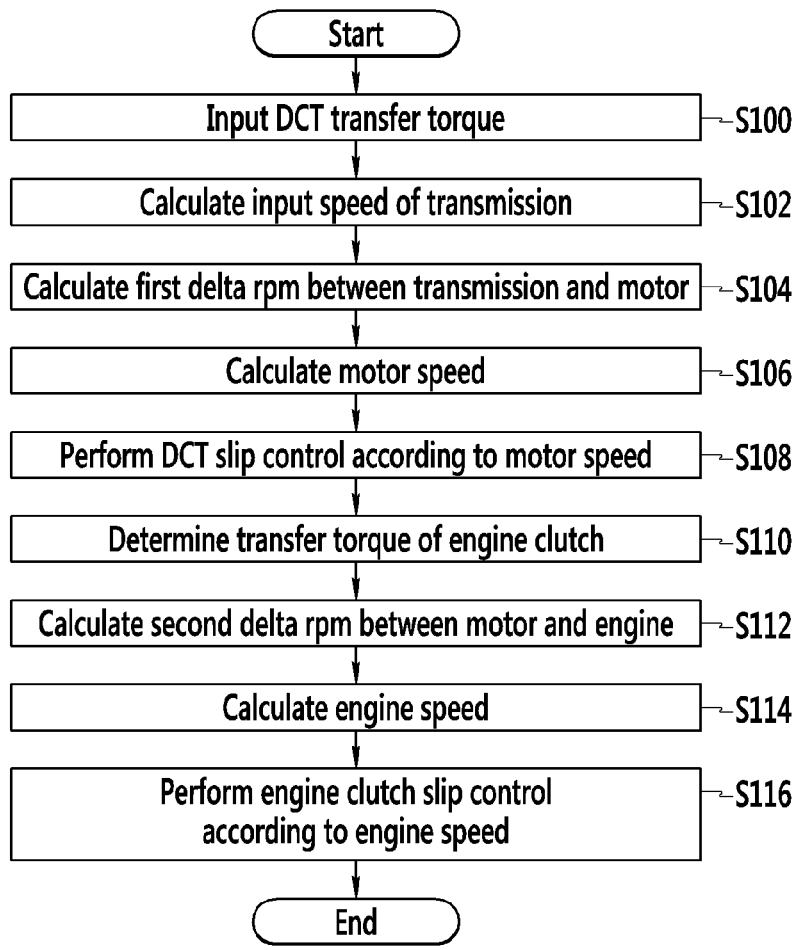

APPARATUS AND METHOD FOR CONTROLLING CLUTCH SLIP OF HYBRID VEHICLE

CROSS-REFERENCE TO RELATED APPLICATION

This application claims under 35 U.S.C. §119(a) priority to and the benefit of Korean Patent Application No. 10-2013-0163786 filed in the Korean Intellectual Property Office on Dec. 26, 2013, the entire contents of which are incorporated herein by reference.

BACKGROUND (a) Field of the Invention

The present invention relates to an apparatus and a method for controlling a clutch slip of a hybrid vehicle, and more particularly, to an apparatus and a method for controlling a clutch slip enable slipping even in a dry engine clutch having a small heat capacity by simultaneously slipping an engine clutch and a dual clutch in a hybrid vehicle mounted with a dual clutch transmission (DCT) to disperse the heat capacity.

(b) Description of the Related Art

A hybrid vehicle refers to a vehicle that efficiently combines two or more kinds of different power sources, in most cases, an engine that obtains driving force by combusting fuel (fossil fuels such as gasoline) and an electric motor that obtains driving force by battery power.

The hybrid vehicle may be formed in various structures by using the engine and the electric motor as the power source. For example, a vehicle that directly transfers mechanical power of the engine to wheels and is assisted by using the electric motor driven by electric power of the battery if necessary is called a parallel hybrid vehicle, and a vehicle that converts the mechanical power of the engine into electric power through an electric generator to drive the electric motor or charge the electric power in the battery is called a series hybrid vehicle.

In the parallel hybrid vehicle, the engine and the motor are connected to each other by an engine clutch, a dual clutch is connected to shafts of the engine and the motor, and a transmission is connected to the dual clutch.

Meanwhile, the hybrid vehicle has an EV mode in which the engine clutch is not coupled and the hybrid vehicle is driven by only the motor, an HEV mode in which the engine clutch is coupled and both the engine and the motor are driven, and a slip driving mode in which the engine clutch is not perfectly coupled in the HEV mode and a torque of the engine is transferred while rotation speeds of the engine and the motor are different from each other.

In the HEV mode, when an input speed input to the transmission as a sum of output torques of the engine and the motor by coupling the engine clutch is smaller than an idle rotation speed of the engine, in order to transfer driving force of the engine to the transmission, the engine clutch is controlled to be in a slip state, and in order to transfer a target engine torque, a hydraulic flow of the engine clutch is controlled.

However, the dry engine clutch used in the hybrid vehicle has a small heat capacity, and thus there is a high risk that the engine clutch is burned out during a slip control, and a dry engine clutch having a large heat capacity is very expensive.

The above information disclosed in this Background section is only for enhancement of understanding of the background of the invention and therefore it may contain information that does not form the prior art that is already known in this country to a person of ordinary skill in the art.

SUMMARY

Therefore, the present invention provides an apparatus and a method for controlling a clutch slip of a hybrid vehicle having advantages of performing slipping even in a dry engine clutch having a small heat capacity by simultaneously slipping an engine clutch and a dual clutch in a hybrid vehicle mounted with a dual clutch transmission (DCT) to disperse the heat capacity.

An exemplary embodiment of the present invention provides an apparatus for controlling a clutch slip of a hybrid vehicle, including: an engine clutch selectively connecting an engine and a motor generating power; a dual clutch mechanism selectively connecting the motor and a transmission; and a controller controlling an operation of the engine clutch and two clutches of the dual clutch mechanism, in which the controller simultaneously performs a dual clutch slip control according to a motor speed and an engine clutch slip control according to an engine speed.

The slip control of the dual clutch mechanism according to the motor speed may control a slip of at least one clutch provided in the dual clutch mechanism.

The motor speed may be calculated from a first delta RPM between the transmission and the motor, and the first delta RPM may be determined according to a clutch temperature of the dual clutch mechanism.

The controller may calculate an input speed of the transmission according to a transfer torque of the dual clutch mechanism.

The engine speed may be calculated from a second delta RPM between the engine and the motor, and the second delta RPM may be determined according to a temperature of the engine clutch.

Another exemplary embodiment of the present invention provides a method for controlling a clutch slip of a hybrid vehicle including a motor selectively connected to an engine through an engine clutch and a transmission selectively connected to the motor through a dual clutch mechanism having two clutches, the method including: receiving a transfer torque of the dual clutch mechanism; calculating a motor speed from the transfer torque of the dual clutch mechanism; determining a transfer torque of the engine clutch; calculating an engine speed from the transfer torque of the engine clutch; and simultaneously performing a slip control of the dual clutch mechanism according to the calculated motor speed and a slip control of the engine clutch according to the calculated engine speed.

The step of calculating the motor speed may include: calculating an input speed of the transmission; calculating a first delta RPM between the transmission and the motor; and calculating a motor speed from the first delta RPM.

The input speed of the transmission may be determined according to the transfer torque of the dual clutch mechanism.

The first delta RPM may be determined according to a clutch temperature of the dual clutch mechanism.

The step of calculating the engine speed may include calculating a second delta RPM between the motor and the engine.

The second delta RPM may be determined according to a temperature of the engine clutch.

A non-transitory computer readable medium containing program instructions executed by a processor on a controller can include: program instructions that receive a transfer torque of a dual clutch mechanism; program instructions that calculate a motor speed from the transfer torque of the dual clutch mechanism; program instructions that determine a transfer torque of an engine clutch; program instructions that calculate an engine speed from the transfer torque of the engine clutch; and program instructions that simultaneously perform a slip control of the dual clutch mechanism according to the calculated motor speed and a slip control of the engine clutch according to the calculated engine speed.

As described above, according to the exemplary embodiment of the present invention, since a slip is performed even in a dry engine clutch having a small heat capacity, cost may be reduced, and the heat capacity is dispersed to improve durability of the engine clutch.

BRIEF DESCRIPTION OF THE DRAWINGS

FIG. 2 is a flowchart illustrating a method for controlling a clutch slip of a hybrid vehicle according to another exemplary embodiment of the present invention.

DETAILED DESCRIPTION OF THE EMBODIMENTS

Figure 1:
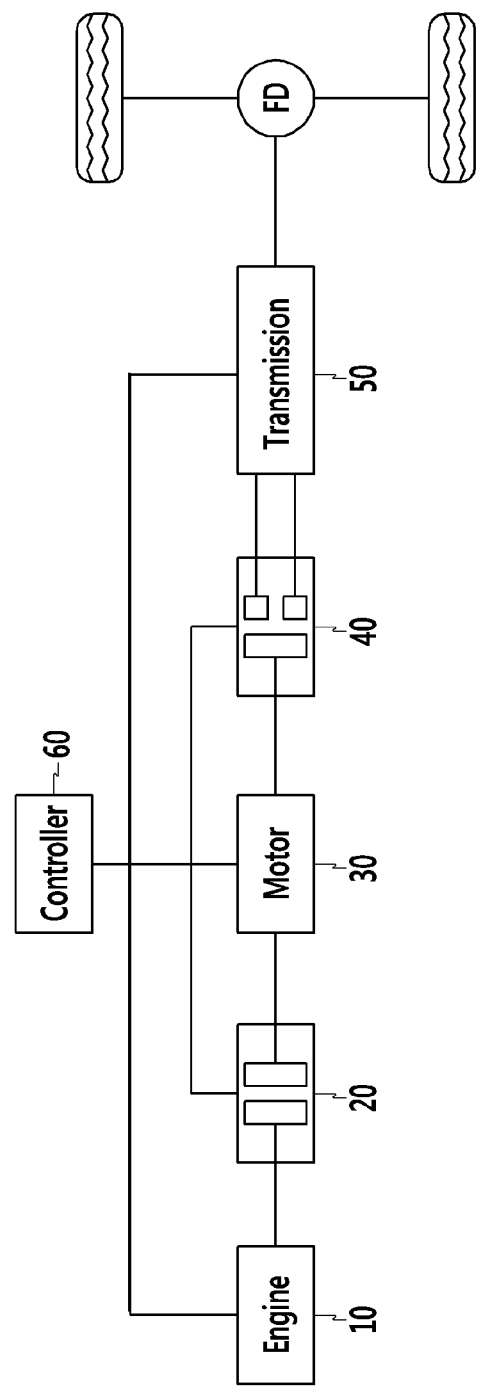
FIG. 1 is a block diagram illustrating an apparatus for controlling a clutch slip of a hybrid vehicle according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

An exemplary embodiment of the present invention will hereinafter be described in detail with reference to the accompanying drawings.

FIG. 1 is a block diagram illustrating an apparatus for controlling a clutch slip of a hybrid vehicle according to an exemplary embodiment of the present invention.

Referring to FIG. 1, an apparatus for controlling a clutch slip of a hybrid vehicle according to the exemplary embodiment of the present invention includes an engine 10, an engine clutch 20, a motor 30, a dual clutch mechanism 40, a transmission 50, and a controller 60.

As illustrated in FIG. 1, the engine 10 is connected with the motor 30 by the engine clutch 20, the dual clutch mechanism 40 is connected with shafts of the engine 10 and the motor 30, and the transmission 50 is connected to the dual clutch mechanism 40.

The engine clutch 20 is disposed between the engine 10 and the motor 20 to receive a control signal of the controller 60 and selectively connect the engine 10 and the motor 30 according to a driving mode of the hybrid vehicle.

In the dual clutch mechanism 40, a plurality of input gears is distributed at two input shafts, and a plurality of output gears gear-coupled with the plurality of input gears is distributed at two output shafts. Further, the dual clutch mechanism 40 includes a plurality of synchronizer mechanisms, and the plurality of synchronizer mechanisms selectively operates to connect one of the plurality of output gears and one of the two output shafts. Further, the dual clutch mechanism 40 includes two clutches. Each clutch transfers power of a power source (for example, an engine or motor) to any one of the two input shafts connected with the transmission 50. As the clutch, a dry or wet clutch may be used.

The transmission 50 supplies a sum of an output torque of the engine 10 and an output torque of the motor 30 determined by coupling and releasing of the engine clutch 20 as an input torque and selects any shift gear according to a vehicle speed and a driving condition to output driving force to a driving wheel and maintain driving.

The controller 60 outputs the control signal to disconnect the engine clutch 20 and the dual clutch mechanism 40. The controller 60 may perform a method for controlling a clutch slip of the hybrid vehicle according to an exemplary embodiment of the present invention to be described below through a cooperative control between many controllers provided in the hybrid vehicle. For example, a hybrid control unit (HCU) as a top controller, an engine control unit (ECU) controlling the entire engine operation, a motor control unit (MCU) controlling the entire operation of the driving motor, a transmission control unit (TCU) controlling the transmission, and the like may be used. Accordingly, for convenience of description, one or more controllers provided in the hybrid vehicle are commonly called the controller 60.

The controller 60 calculates a motor speed according to a clutch temperature of the dual clutch mechanism 40 to perform a slip control of the dual clutch mechanism 40, and simultaneously, calculates an engine speed according to a temperature of the engine clutch 20 to perform a slip control of the engine clutch 20. To this end, the controller 60 may be implemented by one or more processors operating by a set program, and the set program may be programmed so as to perform each step of the method for controlling the clutch slip of the hybrid vehicle according to the exemplary embodiment of the present invention.

Hereinafter, a method for controlling a clutch slip of the hybrid vehicle according to the exemplary embodiment of the present invention will be described in detail with reference to FIG. 2.

FIG. 2 is a flowchart illustrating a method for controlling a clutch slip of a hybrid vehicle according to another exemplary embodiment of the present invention.

As illustrated in FIG. 2, the method for controlling a clutch slip of the hybrid vehicle according to the exemplary embodiment of the present invention starts when the dual clutch mechanism 40 receives a transfer torque (S100).

The transfer torque of the dual clutch mechanism 40 may become a sum of an output torque of the engine 10 and an output torque of the motor 30. In this case, when the driver intends to accelerate, since a value of a driver demand torque is larger than the sum of the output torque of the engine 10 and the output torque of the motor 30, the transfer torque of the dual clutch mechanism 40 may become the driver demand torque.

When the value of the transfer torque is input to the dual clutch mechanism 40, the controller 60 calculates an input speed of the transmission 50 based on the transfer torque of the dual clutch mechanism 40 (S102).

The input speed of the transmission 50 may be calculated by considering the speed of the hybrid vehicle and maximum output limit torques of the engine 10 and the motor 30.

In step S102, when the input speed of the transmission 50 is calculated, the controller 60 calculates a first delta RPM between the transmission 50 and the motor 30 (S104).

The first delta RPM is a difference value between a rotation speed of the motor and an input speed of the transmission after synchronization of the motor 30 and the transmission 50 proceeds and a predetermined time elapses. The predetermined time may be arbitrarily set, but preferably, may be set so that the difference in speed between the motor 30 and the transmission 50 is approximately less than 15%.

The first delta RPM may be calculated according to the transfer torque of the dual clutch mechanism 40 and the clutch state. Particularly, a temperature of oil is determined according to a clutch temperature, and a hydraulic flow may be calculated. In addition, the hydraulic flow may be calculated by considering a clutch friction coefficient, a clutch effective radius, and the like.

In step S104, when the first delta RPM is calculated, the controller 60 calculates the speed of the motor 30 (S106).

The speed of the motor 30 may be calculated by the difference value of the first delta RPM in the input speed of the transmission 50.

After the controller 60 calculates the speed of the motor 30, the controller 60 performs a slip control of the dual clutch mechanism 40 by synchronizing the dual clutch mechanism 40 according to a speed of the motor 30 (S108).

The controller 60 may perform steps S110 to S116 to be described below in addition to steps S100 to S108. To this end, the controller 60 determines the transfer torque of the engine clutch 20 (S110).

The transfer torque of the engine clutch 20 may be calculated from the difference value of the transfer torque of the DCT 40 and the output torque of the motor 30.

In step S110, when the transfer torque of the engine clutch 20 is calculated, the controller 60 calculates a second delta RPM between the motor 30 and the engine 10 (S112).

The second delta RPM means a difference value of the rotation speed of the motor 30 and the rotation speed of the engine 10, and may be determined according to a clutch temperature of the engine clutch 20. Like the first delta RPM, the second delta RPM may be calculated by considering a clutch friction coefficient, a clutch effective radius, and the like based on the hydraulic flow depending on the clutch temperature and the oil temperature.

In step S112, when the second delta RPM is calculated, the controller 60 calculates the speed of the engine 10 (S114).

The speed of the engine 10 may be calculated from a difference value of the speed of the motor 30 calculated in step S106 and the second delta RPM calculated in step S112.

When the controller 60 calculates the speed of the engine 10, the slip control of the engine clutch 20 is performed according to the speed of the engine 10 (S116).

That is, when the controller 60 simultaneously performs step S108 and step S116, the heat capacity is dispersed in the engine clutch 20 and the dual clutch mechanism 40, and as a result, a dry clutch having a small heat capacity instead of a wet clutch may be used, thereby reducing cost.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for controlling a clutch slip of a hybrid vehicle, comprising:
    an engine clutch selectively connecting an engine and a motor generating power;
    a dual clutch mechanism selectively connecting the motor and a transmission; and
    a controller controlling an operation of the engine clutch and two clutches of the dual clutch mechanism,
    wherein the controller simultaneously performs a dual clutch slip control according to a motor speed and an engine clutch slip control according to an engine speed.

2. The apparatus of claim 1, wherein:
    the slip control of the dual clutch mechanism according to the motor speed controls a slip of at least one clutch provided in the dual clutch mechanism.

3. The apparatus of claim 1, wherein:
    the motor speed is calculated from a first delta RPM between the transmission and the motor.

4. The apparatus of claim 3, wherein:
    the first delta RPM is determined according to a clutch temperature of the dual clutch mechanism.

5. The apparatus of claim 1, wherein:
    the controller calculates an input speed of the transmission according to a transfer torque of the dual clutch mechanism.

6. The apparatus of claim 1, wherein:
    the engine speed is calculated from a second delta RPM between the engine and the motor.

7. The apparatus of claim 6, wherein:
    the second delta RPM is determined according to a temperature of the engine clutch.

8. A method for controlling a clutch slip of a hybrid vehicle including a motor selectively connected to an engine through an engine clutch and a transmission selectively connected to the motor through a dual clutch mechanism having two clutches, the method comprising:
    receiving a transfer torque of the dual clutch mechanism;
    calculating a motor speed from the transfer torque of the dual clutch mechanism;
    determining a transfer torque of the engine clutch;
    calculating an engine speed from the transfer torque of the engine clutch; and simultaneously performing a slip control of the dual clutch mechanism according to the calculated motor speed and a slip control of the engine clutch according to the calculated engine speed.

9. The method of claim 8, wherein:
the step of calculating the motor speed includes:
calculating an input speed of the transmission;
calculating a first delta RPM between the transmission and the motor; and
calculating the motor speed from the first delta RPM.

10. The method of claim 9, wherein:
the input speed of the transmission is determined according to the transfer torque of the dual clutch mechanism.

11. The method of claim 9, wherein:
the first delta RPM is determined according to a clutch temperature of the dual clutch mechanism.

12. The method of claim 8, wherein:
the step of calculating the engine speed includes calculating a second delta RPM between the motor and the engine.

13. The method of claim 12, wherein:
the second delta RPM is determined according to a temperature of the engine clutch.

14. A non-transitory computer readable medium containing program instructions executed by a processor on a controller, the computer readable medium comprising:
program instructions that receive a transfer torque of a dual clutch mechanism;
program instructions that calculate a motor speed from the transfer torque of the dual clutch mechanism;
program instructions that determine a transfer torque of an engine clutch;
program instructions that calculate an engine speed from the transfer torque of the engine clutch; and
program instructions that simultaneously perform a slip control of the dual clutch mechanism according to the calculated motor speed and a slip control of the engine clutch according to the calculated engine speed.

* * * * *